Figure 1:
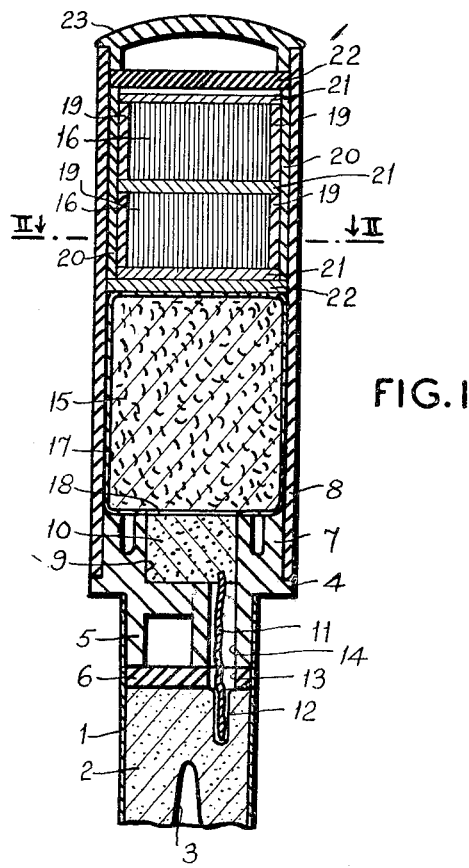

Aug. 14, 1962 A. J. SCHERMULY 3,049,080
ROCKETS AND ROCKET-BORNE DISTRESS SIGNALS
Filed April 17, 1959

Inventor
Alfred James Schermuly
By his attorneys
Howson and Howson

United States Patent Office 3,049,080
Patented Aug. 14, 1962

3,049,080
ROCKETS AND ROCKET-BORNE DISTRESS SIGNALS
Alfred James Schermuly, Dorking, England, assignor to The Schermuly Pistol Rocket Apparatus Limited, Dorking, England, a British company
Filed Apr. 17, 1959, Ser. No. 807,125
2 Claims. (Cl. 102—34.4)

The present invention relates to an improved rocket and in particular an improved rocket-borne distress signal.

Rocket-borne distress signals are known which comprise an illuminating flare which is carried to a predetermined height by a rocket and then ejected from the rocket casing and simultaneously ignited. Such rocket-borne distress signals are commonly employed by persons in distress on sea or on land for the purpose of guiding rescue parties. It frequently occurs, however, that the rescue of persons in distress has to be undertaken in very bad weather when visibility is poor. In these circumstances the illuminating flare may not be observed by the rescue parties. Even if the flare is observed there may be so much reflection of the light by clouds, mist or rain that it is practically impossible to pinpoint the location of the flare.

The present invention has for its object to provide a rocket which is capable of emitting a signal which can be detected with great accuracy however bad the visibility may be.

According to the invention a rocket comprises a casing, a rocket propellant composition in the casing, a large number of radar reflecting devices in the casing, an ejecting charge adapted when ignited to eject the radar reflecting devices from the casing, and means for igniting the ejecting charge a predetermined time after the discharge of the rocket.

As the radar reflecting material there may be employed aluminium filaments of silver-plated nylon filaments having a diameter of approximately 0.010 inch and a length of from ½ to 1¼ inches. One or more bundles, each containing a very large number of these filaments, may be arranged near the forward end of the rocket casing, the ejecting charge being adapted to eject the filaments through the forward end of the casing. When the filaments are discharged from the rocket casing they scatter over a considerable area and form a very efficient reflecting screen which can be detected by means of radar sets situated many miles away. Any suitable radar reflecting devices other than the filaments mentioned above may, however, be employed in a rocket according to the invention. Desirable features for the radar reflecting devices are that they shall have an efficient radar reflecting surface and that they shall not descend to earth too rapidly after ejection from the rocket casing. As regards this last feature it will be appreciated that devices with as low a specific gravity as possible are desirable.

The ejecting charge may be ignited by a time fuze which is ignited at the time of discharge of the rocket. Alternatively, the ejecting charge may be ignited from the propellant composition of the rocket when this composition has partly or completely burnt through.

Preferably a conventional illuminating flare is also incorporated in the rocket so that the rocket gives both a visual signal and a signal which may be detected by radar.

Figure 2:
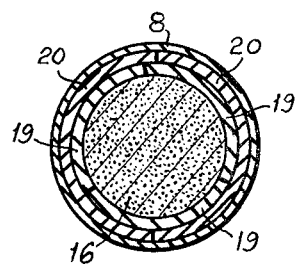

One form of rocket in accordance with the invention will now be described, by way of example, with reference to the accompanying drawing, in which FIGURE 1 is a sectional elevation of the head end of the rocket, and FIGURE 2 is a section on the line II—II of FIGURE 1.

Referring to the drawing, the rocket illustrated comprises a conventional tubular casing 1 containing the rocket propellant composition 2. The tubular casing has its axis lying longitudinal of the rocket. The composition is provided with the usual bore 3 which extends from the choke end of the rocket (not shown) to a point near to the forward end of the composition. The forward end of the casing 1 is closed by a plug 4 comprising an annular portion 5 which fits into the end of the casing 1. A layer 6 of clay is arranged between the annular portion 5 and the forward end of the rocket composition 2. The plug 4 comprises a second annular portion 7 which fits into the end of a tubular casing 8, the casings 1 and 8 having their longitudinal axes in alignment with one another. The centrally disposed recess 9 in the annular portion 7 contains a small charge 10 of explosive powder. A short piece of quickmatch 11 passes from the rocket propellant composition 2 to the explosive charge 10. One end of the quickmatch 11 is received in a recess 12 in the composition 2 and from this recess the quickmatch passes through a bore 13 in the clay layer 6 and a further bore 14 in the plug 4.

The casing 8 houses an illuminating flare 15 and two bundles 16 of silver-plated nylon filaments. The flare 15 is housed in a tubular container 17 which is closed at its end remote from the explosive charge 10 and has an aperture 18 in its end adjacent to the said charge. The container 17 is a sliding fit in the casing 8.

Each of the bundles 16 contains about ten thousand of said silver-plated nylon filaments, the latter being straight, having a length of $^{19}\!/_{32}$ inch and having a diameter of 0.010 inch. Each bundle of filaments is enclosed in a cardboard sleeve formed from three arcuate portions 19, the filaments being arranged with their longitudinal axes parallel to the axis of the casing 8. The two sleeves enclosing the filament bundles are themselves housed in a further cardboard sleeve formed from two semicircular portions 20. The two filament bundles are separated by a cardboard disc 21 and a further two discs 21 are arranged one at each end of the assembly consisting of the two filament bundles 16 and the sleeve portions 19. A cardboard disc 22 is arranged between the closed end of the container 17 and the adjacent disc 21. The end of the casing 8 remote from the casing 1 is closed by a plug 23 and a further disc 22 is arranged between the plug 23 and the adjacent disc 21. The discs 22 have a diameter slightly less than the internal diameter of the casing 8 and the discs 21 have a diameter slightly less than the internal diameter of the sleeve formed by the portions 20. The combined length of the sleeve portions 19 and discs 21 enclosing the filament bundles 16 is slightly less than the length of the sleeve portions 20.

When the above described rocket is launched the propellant composition 2 burns around the surface of the bore 3 and after a time determined by the length of the recess 12 the quickmatch 11 is ignited. The burning quickmatch ignites the explosive charge 10 and the force of explosion of the latter drives the flare 15 and the bundles 16 out of the casing 8. The explosive charge 10 also ignites the flare 15 through the aperture 18 in the container 17. As soon as the bundles 16 have been ejected from the casing 8 the sleeve portions 19 and 20 fall away and allow the filaments to descend in a shower. These descending filaments provide a very efficient radar reflecting screen which can be detected by a radar set located many miles away.

By making the combined length of the sleeve portions 19 and discs 21 less than the length of the sleeve portions 20, the force required to blow the plug 23 out of the end of the casing 8 is transmitted to the plug through the sleeve portions 20 without compressing the filament bundles 16. Consequently, the filaments are ejected from the casing 8 in a loosely compacted state and there is no tendency for them to cluster together as they descend.

The invention is not, of course, limited to the particular rocket described in detail above. Thus, for example, the explosive charge 10 may be ignited by a time fuze arranged to be ignited at the same time as the propellant composition 2. Such a time fuze could be disposed along the inside wall of the casing 1 and would pass from the choke end of the rocket to the charge 10. Again, although two filament bundles 16 are shown in the drawing, only one such bundle, or more than two bundles, may be provided. If desired the illuminating flare 15 may be omitted.

What I claim is:

1. In a rocket-borne distress signal comprising a cylindrical casing having an axis, a rocket unit on one end thereof and a closure plug on the other end thereof, said rocket unit including a rocket propellant composition; a first cylindrical sleeve having an axis colinear with that of the casing and slidably disposed therein, and a second cylindrical sleeve within the first cylindrical sleeve having an axis also colinear with that of the casing and housing a bundle of radar reflecting filaments which filaments are disposed within the second cylindrical sleeve with their longitudinal axes colinear with the axes of the first and second cylindrical sleeves, said sleeves being rigid enough to prevent compaction of the filaments by and upon explosive ejection of the sleeves and filaments therein from the casing by usual means; the first cylindrical sleeve comprising a plurality of arcuate portions with top and bottom disc portions resting thereon, the second cylindrical sleeve comprising within the first sleeve a plurality of arcuate portions with top and bottom disc portions resting thereon, and the length of the arcuate portions forming the said second sleeve being slightly greater than the length of the filaments therein, but the combined length of the arcuate and disc portions of the second sleeve being less than the length of the first sleeve portions; whereby upon explosive ejection of the first and second sleeves and the filaments therein, the longitudinal force required to blow the closure plug out of the casing is transmitted directly to the closure plug through the said first sleeve without compressing the filaments into a wad, which said first sleeve in conjunction with the top and bottom disc portions of said second sleeve also prevents transmission to the filaments of any circumferential compressive force, the filaments thus being ejected from the casing in a loosely associated state, to freely fall and widely disperse after the sleeve and disc portions have fallen away therefrom.

2. In a rocket-borne distress signal as in claim 1 an illuminating flare having its longitudinal axis colinear with that of the casing and slidably disposed therein just beneath the bottom disc portion of the first cylindrical sleeve, the said flare being ignited and ejected by the filament and sleeve ejecting means, simultaneously upon ejection of the filaments and the sleeves.

References Cited in the file of this patent

UNITED STATES PATENTS

| 2,459,687 | Decker | Jan .18, 1949 |
| 2,476,302 | Jeppson | July 19, 1949 |
| 2,503,269 | Hickman | Apr. 11, 1950 |
| 2,807,287 | Frey | Sept. 24, 1957 |
| 2,840,819 | McClellan | June 24, 1958 |

FOREIGN PATENTS

| 579,259 | Great Britain | July 29, 1946 |